United States Patent [19]
Wells et al.

[11] 3,753,593
[45] Aug. 21, 1973

[54] TILTABLE MATERIAL-RECEIVING BIN HAVING ACTUATED DUMPING FLOOR

[75] Inventors: Bernard L. Wells; Hermann V. Stoessel, both of Wichita, Kans.

[73] Assignee: Hesston Corporation, Hesston, Kans.

[22] Filed: Apr. 21, 1971

[21] Appl. No.: 135,986

[52] U.S. Cl. ................... 298/10, 298/1 B, 298/18, 214/510
[51] Int. Cl. ............................................ B60p 1/16
[58] Field of Search ...................... 298/1 B, 10, 18; 214/508, 510

[56] References Cited
UNITED STATES PATENTS

| | | | |
|---|---|---|---|
| 2,460,403 | 2/1949 | Teague | 298/1 B X |
| 3,205,011 | 9/1965 | Diem | 298/10 |
| 2,471,874 | 5/1949 | Johns | 298/26 |
| 2,605,915 | 8/1952 | Day | 298/26 |
| 2,812,210 | 11/1957 | Osborn | 298/10 |
| 3,035,724 | 5/1962 | Clark | 298/1 B |
| 3,043,243 | 7/1962 | McAvoy | 298/26 X |
| 3,348,714 | 10/1967 | Ash | 214/508 |
| 3,408,108 | 10/1968 | Duda | 298/1 B X |

FOREIGN PATENTS OR APPLICATIONS

| | | | |
|---|---|---|---|
| 456,158 | 11/1936 | Great Britain | 298/1 B |

*Primary Examiner*—Richard J. Johnson
*Attorney*—Schmidt, Johnson, Hovey & Williams

[57] ABSTRACT

A bin for receiving forage or the like in the field during harvest is tiltable about an elevated axis for dumping the contents into a wagon box, trailer or truck. The bin has a floor swingable therein at one end of the floor for raising the contents in the bin as the latter is tilted. When the bin reaches its fully tilted position, the floor extends obliquely across the bin from one corner to another. Thus the floor assumes a position having an angle of repose such as to effect a full uniform flow of the material.

14 Claims, 8 Drawing Figures

Patented Aug. 21, 1973
3,753,593
2 Sheets-Sheet 1
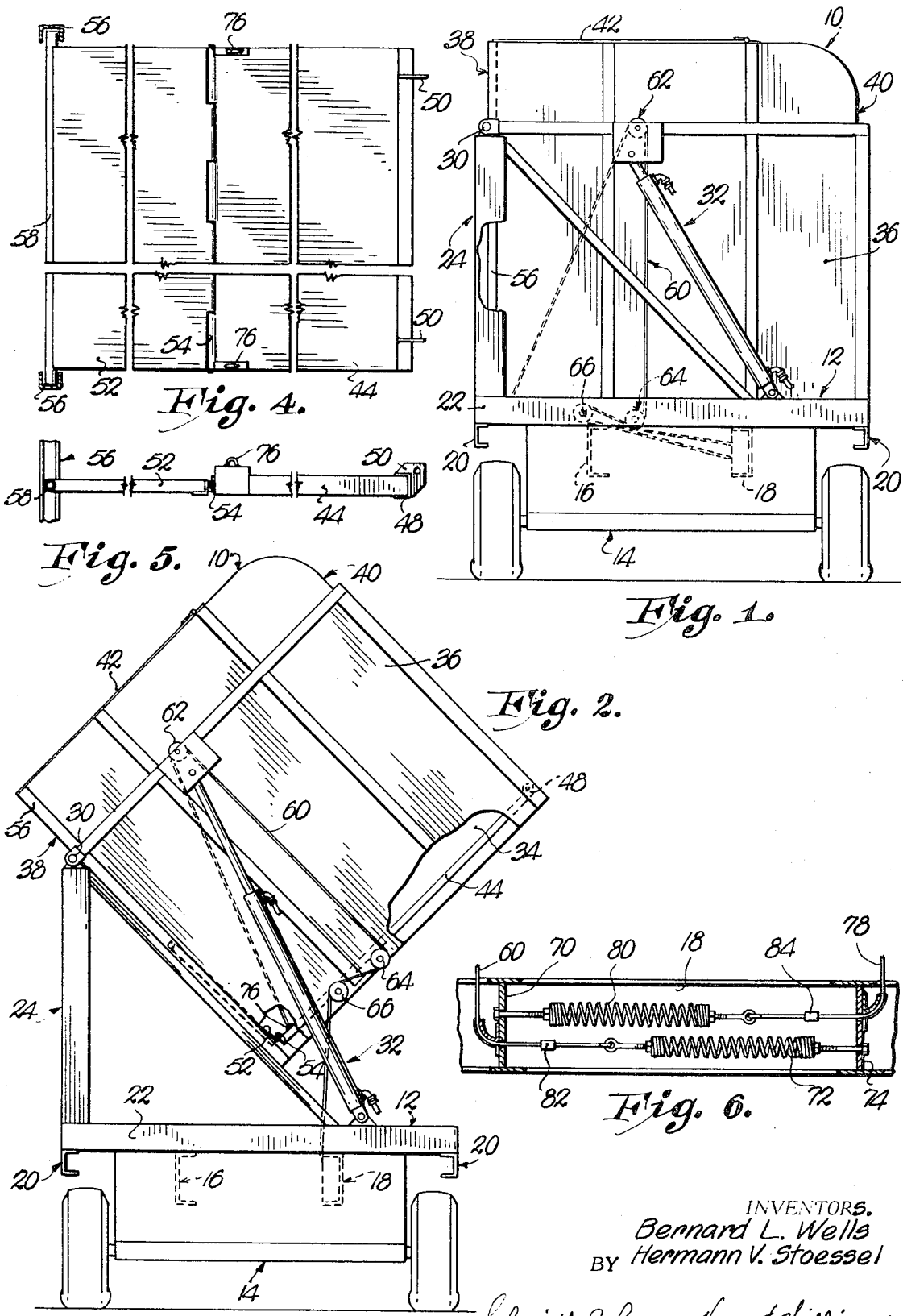

INVENTORS.
Bernard L. Wells
BY Hermann V. Stoessel

Schmidt, Johnson, Hovey & Williams
ATTORNEYS.

TILTABLE MATERIAL-RECEIVING BIN HAVING ACTUATED DUMPING FLOOR

It is common practice to provide vehicles in the field at the time of harvest having bins for receiving the crop directly from the harvester. This practice is especially prevalent in connection with forage harvesters. Such vehicles may be self-propelled, towed by a tractor or pulled by the harvester itself in position to receive the crop from the discharge spout.

Periodically the bin must be emptied into a truck or trailer for hauling the ensilage to the silo. Necessarily, therefore, the bin must have a high fulcrum point about which it swings during tilting to the dumping position so as to clear the sides of the hauling vehicle.

Conventionally, these bins have had relatively low capacities because the dumping requirements necessitated a generally V-shaped configuration. Moreover, during dumping the load in the bin transferred to an off-center position relative to the undercarriage, raising problems of tip-over and undesirable strain on the mechanisms and framework. Furthermore, in forage crops particularly, it has been difficult to provide for even flow from the tilted bed, resulting in gravitation of the entire load en masse into the hauling vehicle and undesirable shock to all equipment.

It is an important object of our present invention, therefore, to provide a material handling assembly capable of causing uniform flow of the material from the bin as it is tilted to the full dump position.

Another important object of the instant invention is the provision of a tiltable bin having a movable floor therein operable in a manner to permit maintenance of the load of the contents of the bin positioned properly above the support or chassis throughout the tiling operation, eliminating the problem of off-side shifting of the center of gravity.

Still another important object of the present invention is to provide unloading mechanism for tiltable bins which permits the use of full capacity configurations notwithstanding the required relatively high tilting axis.

In the drawings:

FIG. 1 is a rear elevational view of a tiltable material-receiving bin having actuated dumping floor made pursuant to our present invention;

FIG. 2 is a view similar to FIG. 1 showing the bin partially tilted;

FIG. 4 is an essentially horizontal cross-sectional view but showing primarily the swingable floor of the bin in plan;

FIG. 5 is a fragmentary edge elevational view of the floor as shown in FIG. 4;

FIG. 6 is an enlarged, fragmentary, detailed cross-sectional view illustrating the lost motion portion of the structure for swinging the floor in response to swinging of the bin;

Figure 3:
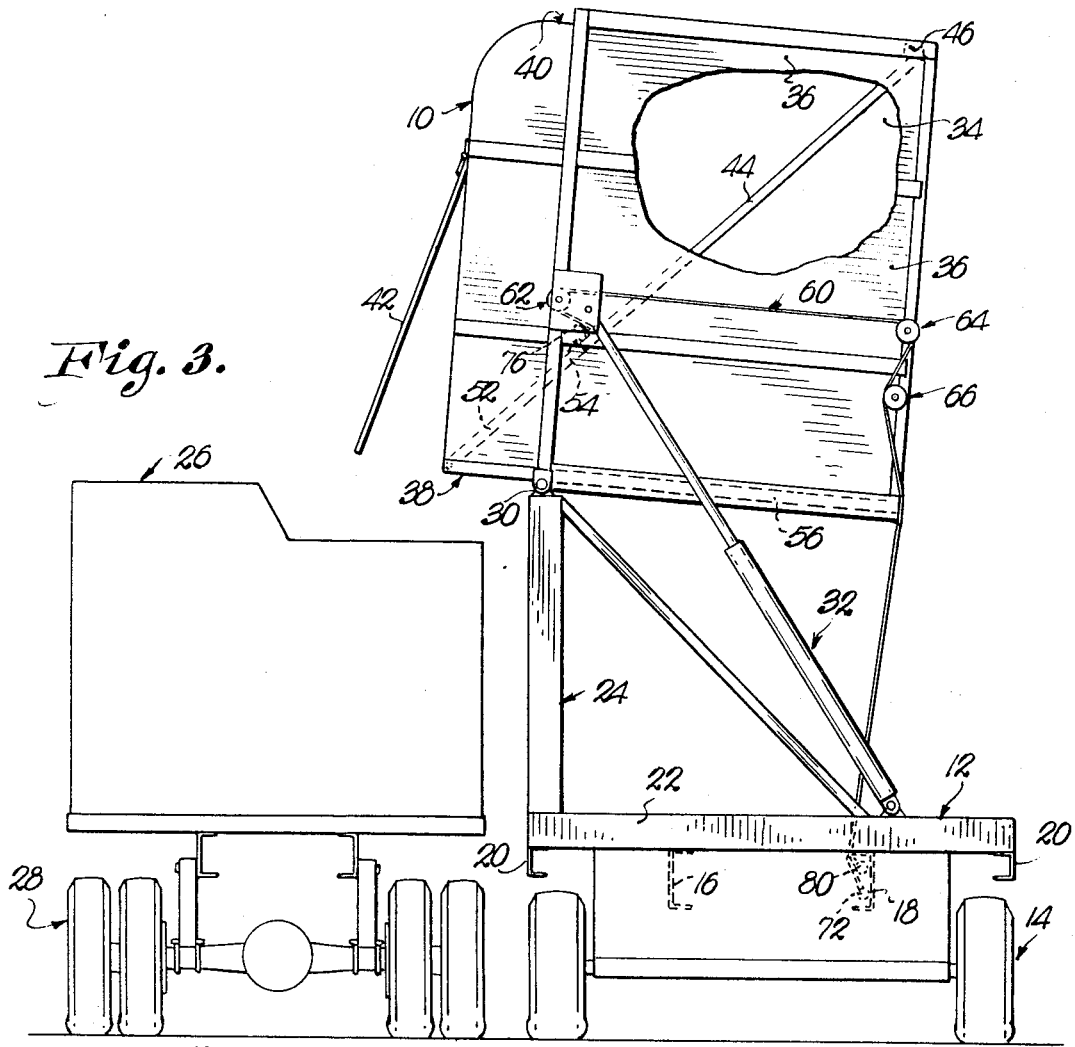
FIG. 3 is a view similar to FIGS. 1 and 2 showing the bin fully tilted and in association with a hauling vehicle.

As will hereinafter appear, the subject matter of the present invention relates broadly to that type of tiltable bin disclosed in the C. B. Osborn U.S. Pat. No. 2,812,210 and the Oskar Diem U.S. Pat. No. 3,205,011 wherein is provided essentially V-shaped boxes or baskets that are tiltable about elevated axes. Prior attempts to assist or augment the gravitational flow of material during dumping include the disclosure of Teague U.S. Pat. No. 2,460,403 providing only for a corner clean-out; the teachings of J. L. Duda U.S. Pat. No. 3,408,108 having a movable floor; the teachings of R. C. Ash U.S. Pat. No. 3,348,714 having to do with the conveyor type discharge floor; and the utilization in M. W. Clark et al. U.S. Pat. No. 3,035,724 of a flexible web serving to eject the contents of a loader bucket during unloading.

In the material handling assembly illustrated by the drawings, mechanisms are provided for overcoming all of the problems above indicated and to accomplish certain new and advantageous results not made possible by the constructions of any of the aforementioned patents. To this end then, there is shown in the embodiment of FIGS. 1–6 a hollow material-receiving bin broadly designated by the numeral 10 normally positioned as shown in FIG. 1 resting upon a supporting framework 12 that may in turn be supported by a wheeled undercarriage 14. In this connection, the overall material handling assembly may be in the form of a trailer transported by a towing vehicle such as a tractor or arranged in a self-propelled unit, it being understood then that the particular nature of the support 12 and of the undercarriage 14 is of no consequence and forms no part of our present invention.

Suffice to point out then is the fact that there is illustrated a chassis that includes a pair of fore-and-aft channel shaped beams 16 and 18 suitably supported by the undercarriage 14 and having the support 12 attached thereto in any desired manner. Thus, for example, the framework 12 may include two or more fore-and-aft frame members 20 and a plurality of cross frames 22 secured to the members 20. Moreover, the framework 12 includes an upstanding frame broadly designated by the numeral 24 normally positioned along one side of the framework 12 so as to permit side dumping into a receiving box 26 of a hauling or transporting vehicle 28, such as a trailer or truck, in the manner illustrated by FIG. 3 of the drawings.

Accordingly, the bin 10 is supported by the upstanding frame 24 at the upper end of the latter by horizontal pivot means 30 extending fore and aft and spaced well above the supporting framework 12 for the bin 10.

The bin 10 is actuated to the dumping position illustrated in FIG. 3 by a pair of fluid pressure piston and cylinder assemblies at the front and back of the bin 10, one only of which is illustrated and designated by the numeral 32. As noted, the assemblies 33 are pivotally connected to the framework 12 in spaced relationship to the upstanding frame 24, and pivotally connected to the bin 10 intermediate the sides of the latter near the top of the bin 10.

The somewhat cubicle bin 10 is provided with four upstanding walls including a front wall 34, a rear wall 36, a sidewall 38 and an opposed sidewall 40. The significance of such boxlike construction of the bin 10 lies in the fact that it provides for full capacity without loss of space as distinguished from the rather conventional V-shaped configuration illustrated, for instance, in U.S. Pat. Nos. 2,812,210 and 3,205,011 above mentioned. If desired, the bin 10 may also be provided with a top wall having a swingable lid 42 that opens automatically by gravity when the bin 10 is in the dumping position shown in FIG. 3.

In accordance with the improvements of the present invention, bin 10 is provided with a bottom or floor 44 spanning the distance between the walls 34 and 36 and mounted for swinging movement within the bin 10 about a horizontal axis 46 adjacent the normally lowermost edge of the wall 40. Such pivotal mounting 46, providing a hinge, may take any suitable form, for example, as shown in FIG. 5, wherein a structural member 48 forming a part of the bin 10 has a plurality of brackets 50 (see also FIG. 4) perforated to receive hinge pins.

Floor 44 is rendered extensible by the provision of a section 52 thereof in the nature of a normally upright panel within the bin 10, spanning the distance between the walls 34 and 36 and normally extending along the inside of the wall 38 adjacent the lower edge of the latter. An articulated joint 54 interconnects the main section of floor 44 with the panel 52 for hinge joint action about a horizontal axis parallel with the axes 30 and 46. The corner posts between walls 34 and 38 and between the walls 36 and 38 are in the nature of upright channels 56, providing tracks or guideways which receive an elongated rod 58 or the like affixed to the normally uppermost edge of the panel 52.

Actuation of the floor 44, and therefore the panel 52, is responsive to the tilting of the bin 10 about the axis 30 and for this purpose structure in the nature of cable and pulley means is provided, operably interconnecting the floor 44, the bin 10 and the beam 18. While but one of such structures is illustrated in the drawings, it is understood that an identical arrangement is provided at the front wall 34 of the bin 10.

Cable 60 has one end thereof attached firmly to the floor 44 adjacent the joint 54 from whence the cable 60 extends upwardly within the bin 10 over a pulley 62 and thence downwardly exteriorly of the bin 10 beneath a pulley 64 and over a pulley 66. An opening (not shown) adjacent the pulley 62 clears the cable 60 for passage from the inside to the outside of the bin 10.

From pulley 66 the cable 60 passes beneath a guide 68 secured to a plate 70 fixed within the beam 18. Cable 60 then passes through the plate 70 and connects with a spring 72 that is in turn attached to a second plate 74 within beam 18.

Eyelets 76 are provided for attachment of each of the two cables to the floor 44 and the other cable is shown in FIG. 6, designated by the numeral 78, and connected with a spring 80, all in the same manner as cable 60. Stops 82 and 84 are provided on cables 60 and 78 respectively.

In operation, bin 10 is raised about the axis 30 to the position illustrated in FIG. 2 upon actuation of the assemblies 32 and during such initial lifting of the bin 10 and its contents, a lost motion action takes place to eliminate the need for raising the contents of the bin 10 therewithin, not only because such is not necessary but because of the fact that the lost motion lessens the power requirements during initial lifting. This is accomplished by virtue of the fact that cables 60 and 78 do not become operable to actuate the floor 44 until such time as stops 82 and 84 come into contact with the plates 70 and 74 respectively. However, at all times while the stops 82 and 84 are spaced from the plates 70 and 74, the springs 72 and 80 maintain the cables 60 and 78 taut.

As soon as the cables 60 and 78 become effectively connected to the plates 70 and 74 because of the stops 82 and 84, cables 60 and 78 commence lifting the floor 44, causing it to swing inwardly and upwardly within the bin 10 and about the axis 46. At the same time, the panel 52 commences to rise within the guide tracks 56 and a hinging action takes place between the floor 44 and the panel 52 along the joint 54.

By the time the bin 10 reaches or approaches the full tilt position shown in FIG. 3 the floor 44 and the panel 52 will have become fully extended with the rod 58 disposed adjacent suitable stops at the normally upper ends of the guide channels 56. Thus, as is clear in FIG. 3, the contents of the bin 10 will all slide therefrom along the floor 44 and the panel 52 into the box 26.

It is to be understood, however, that as the bin 10 moves from the position shown in FIG. 2 to the position shown in FIG. 3 the material within the bin 10 will commence to flow therefrom over the normally uppermost edge of the wall 38 into the box 26 such that the flow is gradual and uniform, eliminating the problem of en masse dumping which exists in conventional dump bins or baskets.

Noteworthy is the fact that the section of the cables 60 and 78 between pulley 66 and beam 18 is normally in a substantially horizontal position as shown by dotted lines in FIG. 1. However, after the bin 10 reaches the position shown in FIG. 2, the cables 60 and 78 are essentially vertical between the pulleys 66 and the beam 18, providing a generally straight pull thereon.

Similarly, during movement of the bin 10 from the position shown in FIG. 2 to the position illustrated in FIG. 3, the power assemblies 32 are essentially parallel with that stretch of the cables 60 and 78 between floor 44 and pulleys 62, providing therefore the best mechanical advantage.

Figure 7:
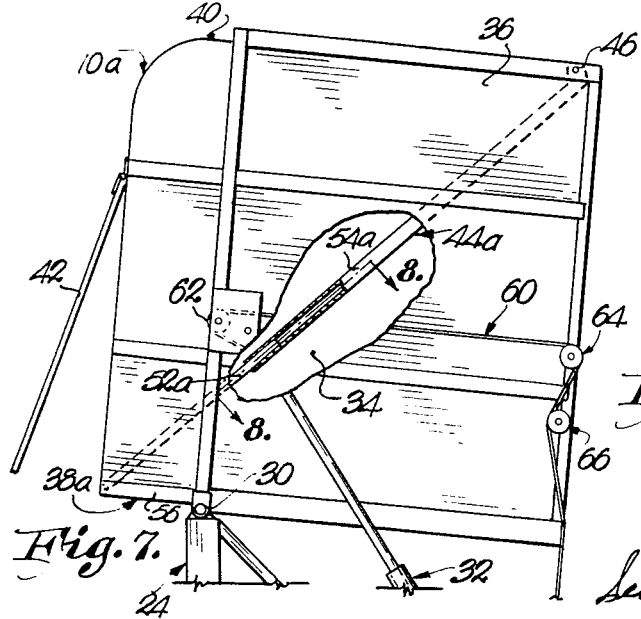
FIG. 7 is a fragmentary view similar to FIG. 3 illustrating a modified form of floor construction.
Figure 8:
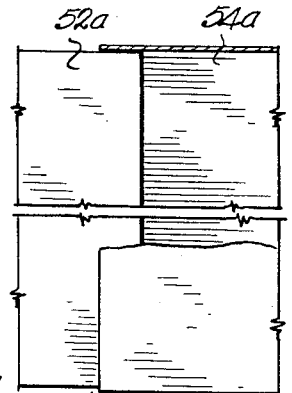
FIG. 8 is a fragmentary, detailed cross-sectional view taken on line 8—8 of FIG. 7.

The material handling assembly illustrated in FIGS. 7 and 8 is essentially the same as the embodiment of FIGS. 1–6 inclusive except only for a modification of the manner of rendering floor 44a extensible. In this instance the panel 52a is telescoped into the proximal end of the floor 44a for free sliding movement therein by the provision of a hollow or tubular portion 54a within the floor 44a.

Accordingly, the only difference in operation is that instead of the two floor sections 44a and 52a articulating relatively as in the case of joint 54 they slide relatively such that as the floor 44a reaches the position illustrated in FIG. 7, the section 52a becomes a continuation thereof to the normally uppermost edge of the wall 38a of the bin 10a.

In any event, when the swingable floors of the two forms of our invention attain the position extending obliquely across the bins, the angle of repose is such that all remaining material flows smoothly from the floor to the open top of the box 26. Important also is the fact that the bin 10, when in the position shown in FIG. 3, remains essentially above the support 12 with the wall 38 substantially horizontal, eliminating the need to swing the bin 10 farther beyond the position shown in FIG. 3 about the axis 30 where the bin 10 and its contents are disposed to the outside of the upstanding frame 24, as heretofore necessary in prior constructions. The same advantage is of course apparent in the embodiment of FIGS. 7 and 8.

Having thus described the invention, what is claimed as new and desired to be secured by Letters Patent is:

1. A material handling assembly comprising:
   a support;

a material receiving bin normally resting on said support;

a normally horizontal floor;

hinge means attaching the floor to the bin for swinging movement of the floor relative to the bin to and from an inclined position;

an upstanding frame on said support;

pivot means spaced above the support and mounting the bin on the frame for swinging movement of the bin away from the support to a material dumping position; and power structure coupled with said floor and disposed for actuation by the bin as the latter is swung to the dumping position for forcibly swinging the floor to said inclined position in response to swinging of the bin to said dumping position, said floor extending obliquely across the bin when the same is in said inclined position for flow of material along the floor from said bin.

2. A material handling assembly as claimed in claim 1, said bin having a pair of opposed walls, said hinge means being disposed adjacent the normally lower end of one of said walls, said pivot means being disposed adjacent the normally upper end of the other of said walls.

3. A material handling assembly as claimed in claim 2, said hinge means being at one end of the floor; and means guiding the opposite end of the floor along said other wall as the bin is swung to and from said dumping position.

4. A material handling assembly as claimed in claim 3, said floor being extensible between the hinge means and said guiding means as the floor swings to said inclined position.

5. A material handling assembly as claimed in claim 3, said floor having a pair of interconnected sections extensible between the hinge means and said guiding means as the floor swings to said inclined position.

6. A material handling assembly as claimed in claim 5, said sections being provided with articulating means interconnecting the same for relative swinging movement about an axis parallel with the axis of the hinge means.

7. A material handling assembly as claimed in claim 5, said sections being relatively telescoped.

8. A material handling assembly comprising:

a support;

a material receiving bin normally resting on said support, said bin having a pair of spaced, normally upright sidewalls and a normally horizontal wall;

an upstanding frame on said support along one of said sidewalls;

pivot means at the upper ends of the frame and said one sidewall and mounting the bin on the frame for swinging movement of the bin away from the support to a material dumping position with said sidewalls generally horizontal and overlying said support;

hinge means at the normally lowermost end of the other of said sidewalls attaching the horizontal wall to the bin for swinging movement to and from an inclined position extending from said hinge means toward said upper end of said one sidewall when the bin is in said dumping position; and structure coupled with said horizontal wall for swinging the latter to said inclined position in response to swinging of the bin to said dumping position.

9. A material handling assembly as claimed in claim 8, said structure including cable and pulley means interconnecting the bin, the horizontal wall and the support.

10. A material handling assembly as claimed in claim 9, said structure including pulley means on the bin and a cable having one end thereof attached to the horizontal wall and the opposite end thereof attached to said support with the cable trained over the pulley means intermediate said ends thereof.

11. A material handling assembly as claimed in claim 8; a normally upright panel within the bin across said one sidewall adjacent the lower end of the latter; an articulated joint between the floor and the panel; and means for guiding the panel toward said pivot means as the horizontal wall swings to said inclined position whereby the panel serves as an inclined floor extension for flow of material from the bin.

12. A material handling assembly as claimed in claim 8, said bin having a pair of spaced normally upright end walls interconnecting the sidewalls, the sidewalls and the end walls being normally perpendicular to the horizontal wall.

13. A material handling assembly as claimed in claim 8, said structure being provided with lost motion means for delaying the swinging of the horizontal wall about said hinge means as the bin swings away from the support.

14. A material handling assembly as claimed in claim 13, said lost motion means being interposed in the cable; and yieldable means maintaining the cable taut during said delay.

* * * * *